United States Patent Office 3,220,974
Patented Nov. 30, 1965

3,220,974
EPOXY MODIFIED POLYCARBONATE
RESINOUS COMPOSITIONS
Daniel W. Fox, Pittsfield, Mass., assignor to General
Electric Company, a corporation of New York
No Drawing. Filed Jan. 2, 1959, Ser. No. 784,432
5 Claims. (Cl. 260—47)

This invention relates to new and improved resinous compositions. More particularly, it relates to polycarbonate compositions containing as a constituent part thereof dihydric phenol-derived carbonate units, in which the carbonate radical is directly attached to a nuclear carbon atom, i.e., to a carbon atom of an aromatic ring, said polycarbonate composition having epoxy end groups.

Epoxy, epoxide or ethoxylene resins as they are variously called, are well known in the art. Generally, such epoxy resins comprise a polyether derivative of a polyhydric organic compound, said derivative containing 1,2 epoxy groups, said compound being selected from the class consisting of polyhydric alcohols and phenols containing at least two phenolic hydroxy groups. For example, U.S. Patent 2,324,483 to Castan discloses epoxy resin compositions comprising the reaction products of phenols having at least two phenolic hydroxy groups and an epihalogenohydrogen such as epichlorohydrin, the product having at least two epoxy groups and being cured to a thermoset infusible mass, by the use of suitable curing agents, some of which include polybasic acids, acid anhydrides, and basic materials. A more recent epoxy resin known as Epon 1310 manufactured by the Shell Development Company is the polyglycidol ether of 1,1', 2,2'-tetra bis(hydroxyphenyl) ethane. While epoxy resins are generally very suitable for a wide range of applications and many of them are tough and flexible at room temperatures, in general they tend to lose strength and flexibility at high temperatures. There are many applications in which it is desirable that a resin used as an adhesive coating, etc., in conjunction with other structures, such as wire arrays, laminates, etc., which expand or move at elevated temperatures, become rubbery or flexible at such temperatures to prevent the disruptive high temperature forces from tearing such structures apart. Thus, in the stator coils of electrodynamic machines, the conductor bars of which are insulated with a resinous material, it is desirable that at high operating temperatures of the order of 80° C. and above, the insulating resin be flexible so that it will conform to the expansion or warping of the conductor bar assemblies. Except for the simpler epoxy resins, free hydroxyl groups occur dispersed along all chains, such hydroxyl groups taking part in the curing, and causing the resin to thoroughly cross-link into a brittle or glass-like material. In the case of simpler epoxy resins, such as diepoxy bisphenol-A, the very short chain is difunctional on both ends, again causing highly cross-linked resins which tend to be brittle.

An object of this invention is to prepare resins containing epoxy groups which are characterized by flexibility at elevated temperatures.

Briefly stated, the invention comprises epoxidized polycarbonate compositions containing as a constituent part thereof dihydric phenol derived carbonate units in which the carbonate radical is directly attached to a nuclear carbon atom, that is, to a carbon atom of an aromatic ring, said carbonate units taking the place of the usual free hydroxy-containing glyceryl ether groups which are normally dispersed along the epoxy resin chain and, in effect, giving flexibility to the resinous compositions.

Any dihydric phenol compound is useful in the practice of this invention, such dihydric phenol being defined as a mononuclear or polynuclear phenol type material in which the hydric or hydroxyl groups are attached directly to nuclear carbon atoms. The dihydric phenol compounds used in connection with the invention can typically be represented by the general formula (I) $$HO-\left[A\underset{L}{\overset{(Y)_m}{\left[\phantom{x}\right]}}\right]_t\left[R_2\underset{L}{\overset{(R)_p}{\left[\phantom{x}\right]}}\right]_s\left[A\underset{L}{\overset{(Y)_m}{\left[\phantom{x}\right]}}\right]_u-OH$$

where R is hydrogen or a monovalent hydrocarbon radical, for example, alkyl radicals (e.g., methyl, ethyl, propyl, isopropyl, butyl, decyl, etc.), aryl radicals (e.g., phenyl, naphthyl, biphenyl, tolyl, xylyl, etc.), aralkyl radicals (e.g., benzyl, ethylphenyl, etc.), cycloaliphatic radicals (e.g., cyclopentyl, cyclohexyl, etc.) as well as monovalent hydrocarbon radicals containing inert substituents therein, such as halogen (chlorine, bromine, fluorine, etc.). It will be understood that where more than one R is used, they may be alike or different. $R_2$ is selected from the group consisting of an alkylene and alkylidene residue such as methylene, ethylene, propylene, propylidene, isopropylidene, butylene, butylidene, isobutylidene, amylene, isoamylene, amylidene, isoamylidene, cyclohexylidene, etc. $R_2$ can also be a silane radical or can be polyalkoxy, such as polyethoxy, polypropoxy, polythioethoxy, polybutoxy, polyphenylethoxy, or polyorganosiloxy, for example, polydimethylsiloxy, polydiphenylsiloxy, polymethylphenylsiloxy, etc. $R_2$ can also consist of two or more alkylene or alkylidene groups such as above, separated by the residue of an aromatic nucleus, a tertiary amino radical, an ether radical, a carbonyl radical, silane radical or siloxy radical, or by a sulfur-containing radical such as sulfide, sulfoxide, sulfone, etc. $R_2$ may also be a glycol dibasic acid ester residue derived from, for example, dibasic acids such as adipic, azelaic, sebacic, isophthalic, terephthalic and other glycols. Other groupings which can be represented by $R_2$ will occur to those skilled in the art. A is the residue of an aromatic nucleus, Y is a substituent selected from the group consisting of (a) inorganic atoms, (b) inorganic radicals, and (c) organic radicals, (a), (b) and (c) being inert to and unaffected by the reactants and by the reaction conditions, $m$ is a whole number including zero to a maximum equivalent to the number of replaceable nuclear hydrogens substituted on the aromatic hydrocarbon residue, $p$ is a whole number including zero to a maximum determined by the number of replaceable hydrogens on $R_2$, $s$ ranges from 0 to 1, $t$ and $u$ are whole numbers including zero. When $s$ is zero, however, either $t$ or $u$ may be zero, and not both.

In the dihydric phenol compound, the substituents Y may be the same or different as may be the R. Among the substituents represented by Y are halogen (e.g., chlorine, bromine, fluorine, etc.) or oxy radicals of the formula OW, where W is a monovalent hydrocarbon radical similar to R, or monovalent hydrocarbon radicals of the type represented by R. Other inert substituents such as a nitro group can be represented by Y. Where $s$ is zero in Formula I, the aromatic nuclei are directly joined with no intervening alkylene or alkylidene or other bridge. The positions of the hydroxyl groups and Y on the aromatic nuclear residues A can be varied in the ortho, meta or para positions and the groupings can be in a vicinal, asymmetrical or symmetrical relationship, where two or more of the nuclearly bonded hydrogens of the aromatic hydrocarbon residue are substituted with Y and the hydroxyl group. Examples of dihydric phenol compounds that may be employed in this invention include 2,2-bis-(4-hydroxyphenyl)-propane (bisphenol-A);
2,4'-dihydroxydiphenylmethane;
bis-(2-hydroxyphenyl)-methane;
bis-(4-hydroxyphenyl)-methane;

bis-(4-hydroxy-5-nitrophenyl)-methane;
bis-(4-hydroxy-2,6-dimethyl-3-methoxyphenyl)-methane;
1,1-bis-(4-hydroxyphenyl)-ethane;
1,2-bis-(4-hydroxyphenyl)-ethane;
1,1-bis-(4-hydroxy-2-chlorophenyl)-ethane;
1,1-bis-(2,5-dimethyl-4-hydroxyphenyl)-ethane;
1,3-bis-(3-methyl-4-hydroxyphenyl)-propane;
2,2-bis-(3-phenyl-4-hydroxyphenyl)-propane;
2,2-bis-(3-isopropyl-4-hydroxyphenyl)-propane;
2,2-bis-(4-hydroxynaphthyl)-propane;
2,2-bis-(4-hydroxyphenyl)-pentane;
3,3-bis-(4-hydroxyphenyl)-pentane;
2,2-bis-(4-hydroxyphenyl)-heptane;
bis-(4-hydroxy-phenyl)-phenyl methane;
bis-(4-hydroxyphenyl)-cyclohexyl methane;
,2-bis-(4-hydroxyphenyl)-1,2-bis-(phenyl) ethane;
2,2-bis-(4-hydroxyphenyl)-1,3-bis-(phenyl) propane;
2,2-bis-(4-hydroxyphenyl-1-phenyl propane; and the like.

Also included are dihydroxybenzenes typified by hydroquinone and resorcinol, dihydroxydiphenyls such as 4,4'-dihydroxydiphenyl; 2,2' - dihydroxydiphenyl; 2,4' - dihydroxydiphenyl; dihydroxynaphthalenes such as 2,6-dihydroxynaphthalene, etc. Dihydroxy aryl sulfones, such as those set forth in application Serial No. 613,817 filed October 4, 1956, assigned to the same assignee as this invention, are also useful, e.g., bis-(4-hydroxyphenyl)-sulfone; 2,4'-dihydroxydiphenyl sulfone; 5'-chloro-2,4'-dihydroxydiphenyl sulfone; 5'-chloro-2,4' - dihydroxydiphenyl sulfone, 3'-chloro-4,4'-dihydroxydiphenyl sulfone; bis-(4-hydroxyphenyl) biphenyl disulfone, etc. The preparation of these and other useful sulfones is described in Patent 2,288,282—Huissmann. Polysulfones, as well as substituted sulfones using halogen, nitrogen, alkyl radicals, etc., are also useful. Dihydroxy aromatic ethers, such as those set forth in application Serial No. 598,768 filed July 19, 1955, and assigned to the same assignee as his invention, are also useful. Methods of preparing such materials are found in Chemical Reviews, 38 414–417 (1956) and Patent 2,739,171—Linn. Exemplary of such dihydroxy aromatic ethers are 4,4'-dihydroxydiphenyl ether;
4,4'-dihydroxytriphenyl ether;
the 4,3'-, 4,2'-, 3,3'-, 2,2'-, 2,3'-, etc. dihydroxylphenyl ethers;
4,4'-dihydroxy-2,5-dimethyldiphenyl ether;
4,4'-dihydroxyl-2,6-dimethyldiphenyl ether;
4,4'-dihydroxy-3,3'-diisobutyldiphenyl ether;
4,4'-dihydroxy-3,3'-diisopropyldiphenyl ether;
4,4'-dihydroxy-3,2'-dinitrodiphenyl ether;
4,4'-dihydroxy-3,3'-dichlorodiphenyl ether;
4,4'-dihydroxy-3,3'-difluorodiphenyl ether;
4,4'-dihydroxy-2,3'-dibromodiphenyl ether;
4,4'-dihydroxydinaphthyl ether;
4,4'-dihydroxy-3,3'-dichlorodinaphthyl ether;
2,4'-dihydroxytetraphenyl ether;
4,4'-dihydroxypentaphenyl ether;
4,4'-dihydroxy-2,6-dimethoxy diphenyl ether;
4,4'-dihydroxy-2,5-diethoxydiphenyl ether, etc.

Mixtures of the dihydric phenols can also be employed, and where dihydric phenol is mentioned herein mixtures of such materials are considered to be included.

When a carbonate ester is used in the preparation of the basic material, the ingredients are reacted at temperatures from about 150° C. to 300° C. or higher for times varying from 1 to 15 or more hours, using an equivalent or more of the bisphenol. Under such conditions, an ester interchange occurs between the carbonate diester and the dihydric phenol compound to produce a hydroxyl terminated polycarbonate material. The ester interchange is advantageously carried out at reduced pressures of around 10 to 100 mm. of mercury, preferably in an inert atmosphere such as of nitrogen, argon, krypton, etc. to prevent undesirable oxidative effects, especially where higher reaction temperatures are used under moderate subatmospheric pressures. Heating under vacuum after the ester interchange is substantially complete (vacuum cooking), for example, at from about 150° C. to 300° C. at 0.01 to 5 to 10 mm. of mercury for extended periods of time may be used to increase the molecular weight of the carbonate polymer if desired.

Although the reaction can be carried out in the absence of a catalyst, one can use the usual ester exchange catalysts, for instance, metallic lithium, potassium, calcium, beryllium, magnesium, zinc, cadmium, aluminum, chromium, molybdenum, iron, cobalt, nickel, silver, gold, tin antimony, lead, barium, strontium, platinum, palladium, etc. and compounds thereof such as alcoholates, oxides, carbonates, acetates, hydrides, etc. Additional catalysts and variations in the ester exchange methods are discussed in Groggins' "Unit Processes in Organic Synthesis" (4th edition, McGraw-Hill Book Company, 1952), pages 616 to 620. The amount of such catalyst is usually quite small and is of the order of 0.001 to 0.1 percent, by weight, based on the total weight of the reactants.

The diaryl carbonates useful in this connection can be represented by the general formula (II) 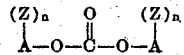

where A is an organic residue in the same sense as in Formula I, Z is an inorganic or organic radical in the same sense as Y of Formula I, and $n$ is an integer. Examples of carbonate esters comprise symmetrical carbonates, for example, diphenyl carbonate, di-(halophenyl) carbonates, e.g., di-(chlorophenyl) carbonate, di-(bromophenyl) carbonate; di - (polyhalophenyl) carbonates, e.g., di-(trichlorophenyl) carbonate, di-(tribromophenyl) carbonate, etc.; di - (alkylphenyl) carbonates, e.g., di-(tolyl) carbonate, etc., di-(naphthyl) carbonate, di-(chloronaphthyl) carbonate, etc., unsymmetrical carbonates, for example, phenyl tolyl carbonate, chlorophenyl chloronaphthyl carbonate, trichlorophenyl chlorotolyl carbonate, etc. Mixtures of the foregoing carbonate esters can also be employed.

These diaryl carbonates can be prepared by the methods described in A. F. Holliman et al., Rec. Trav. Chem. 36, 271 (1916) and Capisarow, J. Chem. Soc. (Brit.) 1929, 251, both of whom disclose preparing dicresyl carbonate by treating the alkali-metal salts of p-cresol with phosgene, and U.S. Patent 2,362,865—Tryon et al., which discloses preparing diphenyl, ditolyl and dinaphthyl carbonates by passing phosgene through a column of the phenol in the presence of a catalyst, etc.

Alternatively, I can carry out the reaction using a direct reaction of phosgene or phosgene-like dibasic acid halide in a solvent system containing an organic basic material, such as a tertiary amine (e.g., pyridine dimethylaniline, quinoline, etc.) or in an aqueous caustic solution. The organic base can be used undiluted or diluted with inert solvents, for example, hydrocarbons such as benzene, toluene, xylene, etc., and halocarbons such as chloroform, chlorobenzene, methylene chloride, etc. Tertiary amines are advantageous in conjunction with the organic base in that they serve to catalyze the reaction, are good solvents, and act as acceptors for halogen acid given off during the reaction.

Although the phosgene reaction can be carried out over a wide range of temperatures, for example, from below 0° C. to over 100° C., the reaction proceeds satisfactorily at 25° C. to 50° C. Since the reaction is exothermic, the rate of phosgene addition can be used to control the reaction temperature. Substantially equimolar amounts of phosgene are preferably used.

Suitable phosgene-like dibasic acid halides, in addition to phosgene, include, for example, dibromo and diiodocarbonyls as well as the bishaloformates of dihydric phenols (e.g., bischloroformates of hydroquinone, bisphenol-A, etc.). Other carbonate precursors will occur to those skilled in the art.

It will be seen that whether a carbonate ester or phosgene is used in the reaction, the dihydric phenol will produce a dihydric phenol carbonate structural unit which can typically be represented by the following general formula wherein the various letters have the same meaning as above:

(III)
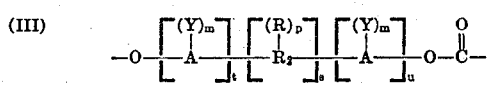

When the hydroxyl terminated polycarbonate resins containing the above units (III) are epoxidized as by the use of epichlorohydrin, a material results which can be represented by the below Formula IV

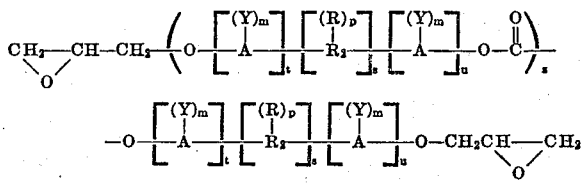

wherein the various letters have the same meaning as above, and z is a whole number from 1 to 1,000. The following examples will illustrate the practice of this invention only as being realized that such examples are illustrative only and not limiting in nature.

*Example 1*

To a solution of 228 grams (1.0 mol) bisphenol-A and 160 grams (4 mol) NaOH and 1000 cc. of water, there was added 60 grams (0.6 mol) phosgene with stirring at the rate of one gram per minute, the reaction temperature being from about 45–50° C. At the conclusion of the phosgene addition, the reaction mixture was carefully neutralized with hydrochloric acid. Next excess epichlorohydrin in the amount of 195 grams (2.0 mol) was added to the reaction mixture. Then 40 grams (1 mol) sodium hydroxide dissolved in 400 cc. of water was added to the above material over a period of 1½ hours, the reaction mixture being stirred after each addition of alkali until the pH dropped to about 8. The reacting mixture during this procedure was at a temperature of from about 73 to 77° C. Methylene chloride in the amount of 250 mols was added to keep the resin dissolved and was then washed repeatedly with water and finally dried with calcium chloride. The solution was then filtered and evaporated to dryness on a water bath with the aid of an aspirator. The resulting product was a solid resin softening between 100–150° C. The epoxy equivalent of the material was 28,000 and a sample cured overnight at 150° C. with amounts of phthalic anhydride ranging from 5 to 10% based on the weight of the resin resulted in a tough material which was insoluble in solvents such as methylene chloride, tetrachloroethane and pyridine which readily dissolved the uncured resin. The cured material was tough at room temperature as well as 150° C. indicating its usefulness for applications where a material flexible at elevated temperatures as well as room temperature is indicated.

*Example 2*

There were dissolved in 250 cc. of water 46 grams (0.2 mol) bisphenol-A and 16 grams NaOH (0.4 mol) with stirring, after which 20 grams (0.2+mol) epichlorohydrin was added, the temperature before addition of the epichlorohydrin being 41° C. While initially the solution was homogenous, after a few minutes of stirring, the solution warmed slightly became cloudy and after reaching a peak temperature of 44.5° C., dropped to a temperature of 42° C. This heating, cooling cycle took approximately 15 minutes. Next about 50 cc. of methylene chloride was added and then phosgene was bubbled in slowly until the pH started to drop. About 10 grams (.10 mol) of phosgene added at a rate of about .25 gm. per minute is required. With the phosgene shut off, the reaction was stirred with refluxing for about one hour, the pH dropping to about 9 during this procedure. The resulting resin phase was washed three times with water, once with saturated sodium bicarbonate and finally with water and dried with calcium chloride. The resin was recovered by aspirating to dryness on a water bath. The epoxy equivalent of this material was about (1800) and a sample cured overnight at 150° C. using 7% by weight of phthalic anhydride based on the weight of the resin was tough and insoluble in boiling tetrachloroethane. A control sample heated without added phthalic anhydride remained soluble.

*Example 3*

Example 2 was repeated except that 23 grams of epichlorohydrin were used. The resulting resin had an epoxy equivalent of 1985 and when cured with 5% by weight of phthalic anhydride at 150° C. for about 16 hours, it was insoluble in cresol, methylenechloride and tetrachloroethane.

There were dissolved in 400 cc. of water 91.2 gm. (0.4 mol) disphenol-A and 32 gm. (0.8 mol) NaOH with stirring, after which 18.4 gm. (0.2 mol) epichlorohydrin was added dropwise. The epichlorohydrin was added at a rate sufficient to hold the reaction mixture at 45° C. Then 50 cc. methylene chloride was added and the reaction mixture was phosgenated with 30 gms. of phosgene over a 30 min. period. The water layer was decanted and discarded. The resin solution was washed with sodium bicarbonate solution after adding one cc. pyridine. The resulting neutralized resin solution was dried over calcium chloride and then freed of solvent by evaporation. The resulting resin had an epoxy equivalent of 2100 and could be cured to an infusible, insoluble, tough resin by heating with various epoxy curing catalysts. A control sample did not cure when heated 12 hrs. at 150° C. without an added catalyst.

There are provided by this invention materials which are useful in applications where a tough, flexible coating or film is required for the protection or insulation of a base material. The present materials are useful for insulating electrical conductors for making molding compounds which may be used as such or filled with other materials such as woodflour, silica type material, carbon black, divided metal, etc. or making molded parts of various shapes.

Films of the material made in conventional ways are useful as wrapping or packaging materials as liners, containers, covers, enclosures and sound recording and other tape. The material in fibrous form is useful for yarn, thread, bristle, rope etc. The products of the invention are further more very useful as laminating adhesives and as adhesives for other applications. The compositions can also be mixed with other resinous materials.

What I claim as new and desire to secure by Letters Patent of the United States is:

1. The resinous reaction product of (a) epichlorohydrin with (b) a preformed polycarbonate of a dihydric phenol.

2. A resinous material comprising the reaction product of a dihydric phenol, epichlorohydrin, and a carbonate precursor selected from the class consisting of carbonate esters, carbonyl halides and haloformates.

3. A resinous material comprising a carbonate polymer having epoxy ether end groups, said carbonate polymer being the polymeric reaction product of materials comprising a dihydric phenol and a carbonate precursor selected from the class consisting of carbonate esters, carbonyl halides, and haloformates, the epoxy ether end groups on said carbonate polymer containing the group

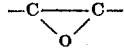

4. The resinous material of claim 3 in which the dihydric phenol is 2,2-bis-(4-hydroxyphenyl)-propane and the carbonate precursor is phosgene.

5. A resinous material comprising a carbonate polymer having epoxy ether end groups, said resinous material being the reaction product of (1) a carbonate polymer of a dihydric phenol and a carbonate precursor selected from the class consisting of carbonate esters, carbonyl halides and haloformates, and (2) epichlorohydrin.

References Cited by the Examiner
UNITED STATES PATENTS
2,795,572  6/1957  Mueller et al. _____ 260—77.5

WILLIAM H. SHORT, Primary Examiner.

HAROLD N. BURSTEIN, MILTON STERMAN, PHILIP E. MANGAN, Examiners.